United States Patent [19]
Jacobs

[11] Patent Number: 5,337,483
[45] Date of Patent: Aug. 16, 1994

[54] GLASS CUTTER

[76] Inventor: Michael Jacobs, 97 Falmouth Ave., Elmwood Park, N.J. 07407

[21] Appl. No.: 54,724

[22] Filed: Apr. 29, 1993

[51] Int. Cl.⁵ ............................................. R26B 3/00
[52] U.S. Cl. ............................................. 30/164.95
[58] Field of Search .................... 30/164.9, 164.95; 83/879, 880

[56] References Cited

U.S. PATENT DOCUMENTS

| D. 252,131 | 6/1979 | Einhorn et al. | 30/164.95 |
|---|---|---|---|
| 2,210,193 | 8/1940 | Aillaud | 49/52 |
| 2,566,544 | 9/1951 | Wyman | 49/52 |
| 2,685,764 | 8/1954 | Hatfield, Jr. | 49/52 |
| 3,138,868 | 6/1964 | Kuthroff | 30/164.95 |
| 3,812,748 | 5/1974 | Nausbaum | 30/164.95 |
| 3,850,062 | 11/1974 | Insolio | 30/164.95 |
| 4,028,801 | 6/1977 | Gelfman | 30/164.95 |
| 4,083,274 | 4/1978 | Insolio et al. | 30/164.95 |
| 4,161,819 | 7/1979 | Pietrantonio | 30/164.95 |
| 4,203,209 | 5/1980 | Insolio | 30/164.95 |
| 4,215,492 | 8/1980 | Raven | 30/164.95 |
| 4,287,669 | 9/1981 | Arai | 30/164.95 |
| 4,327,488 | 5/1982 | Conolly | 30/164.95 |
| 4,528,752 | 7/1985 | Benedict | 30/164.95 |
| 4,819,535 | 4/1989 | Thomas | 83/880 |

*Primary Examiner*—Richard K. Seidel
*Assistant Examiner*—Paul M. Hoyrana, Sr.
*Attorney, Agent, or Firm*—Weingram & Zall

[57] ABSTRACT

A glass cutter is provided having a rectangular body preferably of a transparent plastic. A cutter wheel is mounted inward from the forward edge of the body. The lower surface of the forward portion of the body is inclined upwardly and outwardly to the upper surface of the body to allow the glass cutter to be held at an angle to glass being cut. Additionally, the body of the glass cutter may be of a transparent material and may include an aperture to facilitate viewing a line along which a cut is to be made.

13 Claims, 2 Drawing Sheets

GLASS CUTTER

BACKGROUND OF THE INVENTION

1. Field of the Invention

This invention relates to an improved glass cutter which facilitates the cutting of glass and which allows full visibility of a line along which glass is to be cut.

2. Description of the Prior Art

Conventional glass cutters are hand-held instruments having sharpened wheels which are drawn along a glass plate to score the glass to form a line along which the glass plate can be fractured.

The prior art includes various examples of hand-held glass cutters as follows:

U.S. Pat. No. 2,210,193 to Dillaud discloses a glass cutter which includes a handle portion and a head portion. The head portion includes parallel furcations which support an axle on which a cutter disk rides. The space between the parallel furcations provides a sight line.

U.S. Pat. No. 2,566,544 to Wyman discloses a glass cutter wheel head which is mounted on an axle made from a solid cylindrical rod. A wire clip is provided for hooking the axle and attaching and interconnecting the glass cutter wheel to the holder.

U.S. Pat. No. 2,685,764 to Hatfield discloses a glass cutter having a body with a forwardly projecting arm with a glass scoring element mounted thereon. The projecting arm is resiliently biased downward such that the glass scoring element is normally positioned below the plane of the lower side of the body.

U.S. Pat. No. 3,138,868 to Kuthroff discloses a glass cutter which includes a body with a cutting wheel mounted thereon. A support member is spaced apart from the cutting wheel and provides support to the cutting wheel. The support member retains the cutting wheel in a perpendicular plane with respect to the glass to be cut. Also shown is an adapter body for use with a glass cutter which is received and retained in an aperture which is formed in the body. A concave recess is provided for accommodating the index finger of a user. The user's thumb and middle finger are positioned on either side of the apparatus.

U.S. Pat. No. 4,028,801 to Gelfman discloses a hand held glass cutter having a body which has a cutting wheel and two other points extending from the bottom thereof. The two points lie on a line perpendicular to the plane of the cutting wheel and support the cutting wheel in a position perpendicular to the glass surface. Depressions on the top and side of the device enable the user to grip the housing between the user's thumb and middle finger on the sides of the housing while pressing down on the top of the housing with the index finger.

U.S. Pat. No. 4,327,488 to Connolly discloses a glass cutter having an elongated finger plane formed with a handle portion extending from one end thereof. A flattened finger table is provided on the top of the finger piece for receiving the index and middle fingers of the user.

The entire disclosures of all of these patents are incorporated herein by reference.

A particular problem associated with the various glass cutters which have been used in the past is that the view of the line along which the glass is to be cut is obstructed. In the various glass cutters in the prior art, the body of the glass cutter, other portions of the glass cutter, or the user's hand as it holds the glass cutter obscures the line along which the glass is to be cut, making it difficult for an operator to cut glass accurately, especially if intricate patterns are to be cut.

Another problem with the glass cutters of the prior art is related to the position of the handle portion of the body. In these glass cutters the handle portion is located to the rear of the cutter wheel making it difficult for an operator to apply the proper even and steady pressure to the cutter wheel and resulting in operator fatigue during use.

OBJECTS AND SUMMARY OF THE INVENTION

It is an object of this invention to provide a glass cutter which has a transparent body to thereby facilitate viewing the line along which glass is to be cut.

It is another object of this invention to provide a glass cutter having a body including an aperture to facilitate viewing the line along which the glass is to be cut.

It is still another object of this invention to provide a glass cutter in which the cutting wheel is positioned rearward of the forward edge of the body so that the body may be grasped both in front of and behind the cutter wheel such that greater control over the glass cutter may be maintained.

Another object of the present invention is to provide a glass cutter which is easy to use.

It is a further object of this invention to provide a glass cutter which includes a tapered portion enabling the glass cutter to be maintained at an angle to facilitate cutting.

It is yet a further object of this invention to provide a glass cutter which is made of a relatively small number of relatively simple components resulting in a relatively low manufacturing cost.

The foregoing objects are achieved by the glass cutter of the present invention, which comprises a generally rectangular body, typically of a transparent material such as plastic and a cutter wheel mounted toward one end thereof. The cutter wheel comprises a sharpened wheel mounted on an axle in a manner such that it is partially recessed within the body of the cutter. The edge of the cutter wheel extends from the body.

The cutter wheel is mounted rearward of the forward edge of the body. Preferably, the lower surface of the body, forward of the cutter wheel, inclines from the lower surface of the body outward toward the upper surface of the body.

Additionally, the glass cutter may have a window formed at the center thereof so that a user can see through the body to view the line along which a cut is to be made.

The glass cutter is gripped at the rearward and forward edges of the body with the thumb and the forefinger respectively to permit even pressure to be applied to the body without unduly stressing the index finger as with conventional glass cutters. Because of this manner in which the glass cutter is held, and because of the transparent body, the user has a clear view of a line along which glass is to be cut. Additionally, the manner in which a user grasps the glass cutter body of the present invention allows greater control of the glass cutter over conventional glass cutters and helps to eliminate fatigue during use.

BRIEF DESCRIPTION OF THE DRAWINGS

Other important objects and functional and structural features of the invention will be apparent from the following Detailed Description of the Invention taken in connection with the accompanying drawings in which.

DETAILED DESCRIPTION OF THE INVENTION

Figure 1:
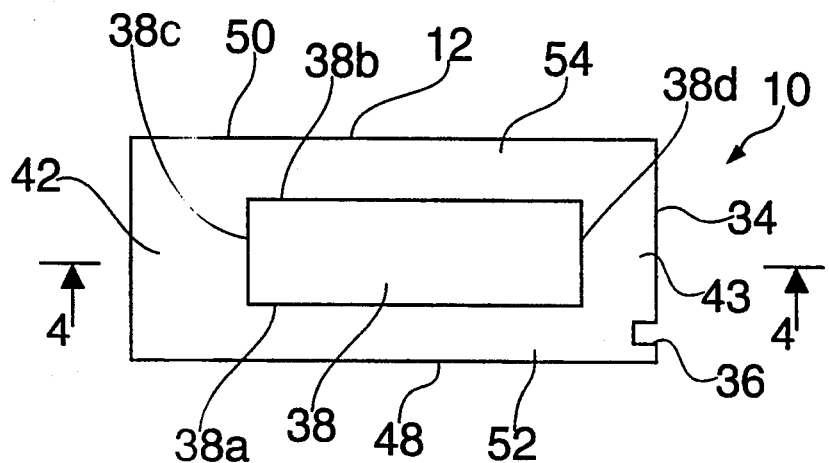
FIG. 1 is a top view of the glass cutter of the present invention.

Referring to the drawings, and in particular FIG. 1, the glass cutter 10 of the present invention includes a generally rectangular body 12. The body 12 is preferably made of a transparent material such as a plastic. Mounted to the body and extending outwardly therefrom is cutter wheel 14. See FIG. 2. The cutter wheel 14 has a sharpened edge, as is best shown in FIG. 6, and is used for scoring glass by drawing the sharpened edge along the glass.

Figure 4:
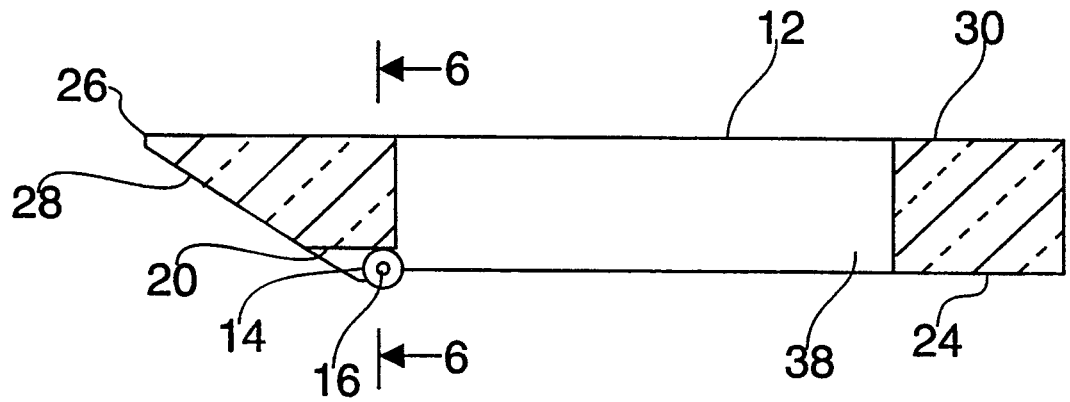
FIG. 4 is a cross-sectional view taken along the lines 4—4 of FIG. 1 and drawn to an enlarged scale.

The cutter wheel 14 is attached to the body 12 of glass cutter 10 in any manner known in the art. For example, it may be mounted on an axle 16 which passes through the body 12 of glass cutter 10 as shown in FIGS. 4 and 6. The axle 16 is set into sockets 17 and 18 formed in the body 12 near the lower surface 24 of the body 12 and towards the forward edge 26 thereof. The axle 16 may be removable from the body 12 to permit replacement of the cutter wheel 14 after it becomes worn. Rotation of the cutter wheel 14 may be achieved by permitting the axle 16 to rotate in sockets 17 and 18 in the body 12, or by permitting cutter wheel 14 to rotate about axle 16.

Figure 6:
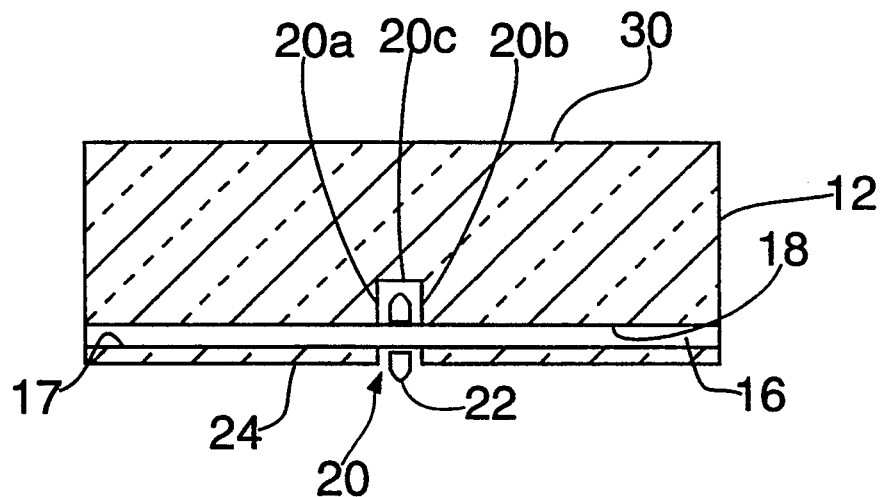
FIG. 6 is a cross-sectional view taken along the lines 6—6 of FIG. 4 and drawn to an enlarged scale.

As shown in FIGS. 4 and 6, the cutter wheel 14 typically rides in a recess portion 20 formed in the body 12 of glass cutter 10. As such, the edge 22 of the cutter wheel 14 extends below the lower surface 24 of the body 12 so that it may contact glass 56 to be cut.

Figure 5:
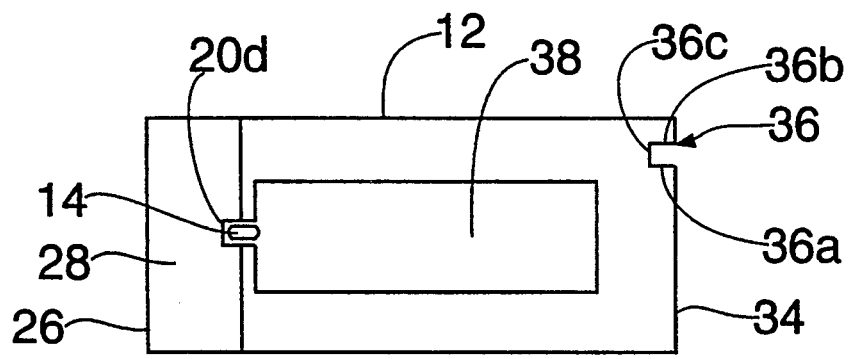
FIG. 5 is a bottom view of the glass cutter of the present invention.

The configuration of the recess 20 is not critical to the invention, but permits the cutter wheel 14 to be mounted on a linear axle 16. As such, the recess 20 includes side walls 20(a) and 20(b), top wall 20(c) and forward wall 20(d). As shown in FIG. 5, the embodiment of the glass cutter 10 depicted does not include a rearward wall for the recess 20, but in other embodiments such a rearward wall may be included. It should also be noted that in another embodiment of this invention, the axle 16 could extend from the lower surface 24 of the body 12 to support the cutter wheel 14 outward of the lower surface 24 to obviate the need for recess 20.

Preferably, the cutter wheel 14 and the axle 16 on which the cutter wheel 14 rides, is positioned rearward of the forward edge 26 of the body 12 of the glass cutter 10. Such positioning allows one to grasp the glass cutter 10 forward and rearward of the cutter wheel 14. The glass cutter 10 configured in such a manner is easy to control by the user, and the user can readily apply proper pressure to the cutter wheel 14 to score the glass.

Figure 2:
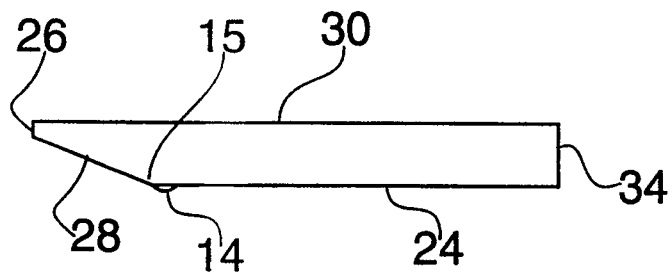
FIG. 2 is a side view of the glass cutter of the present invention.
Figure 7:
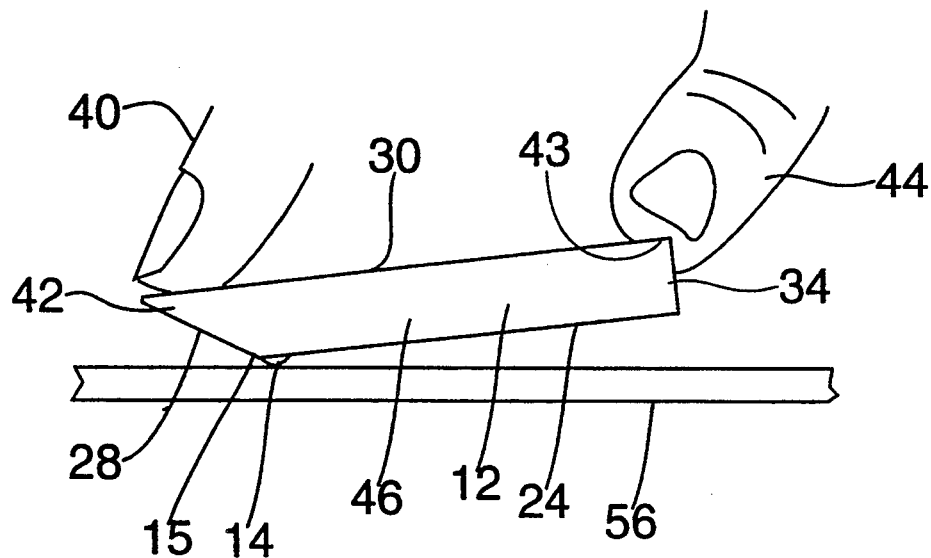
FIG. 7 is a side view showing the glass cutter of the present invention, in use, in the process of cutting glass.

Additionally, as shown in FIG. 2, 4, and 7, it is desirable that the forward surface 28 of the body 12 is angled from the lower surface 24, outward to the upper surface 30 of the body 12. Generally, the cutter wheel 14 is attached to the body at the corner 15 between the angled forward surface 28 and the lower surface 24 of body 12. See FIG. 5. As shown in FIG. 7, this allows the glass cutter 10 to be rocked forward so that it is used at an angle to assure contact of the cutter wheel 14 with the glass. Additionally, using the glass cutter 10 at an angled position facilitates the application of steady force to the glass cutter 10.

Figure 3:
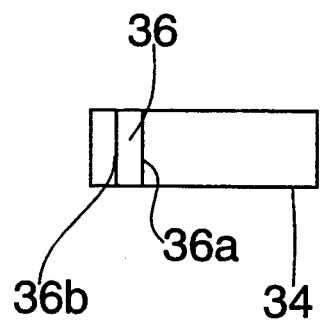
FIG. 3 is a rear view of the glass cutter of the present invention.

As shown in FIGS. 3 and 5, the rear surface 34 of the body 12 typically includes a notch 36 for accepting an edge of a pane of glass which has been scored by the cutter wheel 14. The notch 36 has side walls 36(a) and 36(b) and forward wall 36(c) After the glass has been scored, the notch 36 is fitted about an edge of the glass and the glass cutter body 12 is moved or jerked in a direction perpendicular to the plane of the glass to snap and break the glass along the score line. Note that a plurality of notches of different sizes may be provided on the glass cutter.

An important feature of a preferred embodiment of the present invention is a window 38 through the body 12 from the upper surface 30 to lower the surface 24. The window 38 permits a user unobstructed visibility of a line along which glass is to be cut. The window 38 permits the user to view and cut along intricate patterns. The window 38 may be of any shape and size to enhance the view of the user. In a preferred embodiment, the window 38 is rectangular in shape, having side walls 38(a) and 38(b) and forward and rearward walls 38(c) and 38(d) respectively. Additionally, as shown in FIG. 5, it is desirable for the window to extend to the cutter wheel 14 so that a user can see the cutter wheel 14 and the line along which glass is to be cut. As such, the cutter wheel 14 could extend beyond the forward wall 38(c) of the window 38, as shown in FIG. 5.

When used, the glass cutter 10 is grasped with an index or middle finger 40 at the forward area of the upper surface 30 designated in FIGS. 1 and 7 by reference numeral 42. The user's thumb 44 is placed at or near the rearward edge 34 and upper surface 30 at a position indicated by reference numeral 43. Accordingly, the user's hand is positioned on the side of the body 12 of the glass cutter 10 and does not interfere with the user's view of a line to be cut. The inclined surface 28 allows the glass cutter 10 to be tilted forward as is shown in FIG. 7. The index finger 40 applies pressure to the body 12 forward of the cutter wheel 14 while the thumb 44 applies pressure rearward of the cutter wheel 12. The use of the thumb 44 and the index finger 40 permits a user to apply steady and constant pressure to the cutter wheel 14 without unduly stressing the index finger 40.

The transparent body 12 and the window 38, coupled with the position of the users hand alongside the glass cutter 10 allows full visibility of the line along which the glass 56 is to be cut. Additionally, use of the thumb 44 and index 40 allows greater control over the cutting process than can be achieved with the conventional glass cutters.

The foregoing specific embodiment of the instant invention as set forth in the specification herein is for illustrative purposes only. Various changes and modifications may be made within the spirit and scope of the invention.

What is claimed is:

1. A method for cutting glass comprising the steps of:
    utilizing a glass cutter having a planar body, a window extending through the body and a cutter blade mounted to a lower surface of the body;
    gripping the glass cutter on the upper surface at forward and rearward edges thereof;
    tilting the glass cutter forward to contact the cutter blade with glass;
    applying downward pressure to the glass cutter;
    viewing through the window a line on a glass along which a glass is to be cut by the glass cutter; and
    drawing the glass cutter along a line to be cut to score the glass.

2. The method of claim 1 further including the steps of:
    grasping scored glass to be cut in recesses formed on the body of the glass cutter; and
    snapping the glass to cut the glass along a score.

3. A glass cutter for cutting glass along a line comprising:
    a body having a planar upper surface, a planar lower surface, a rearward edge and a forward edge;
    an axle mounted within the body at the lower surface of the body and rearward of the forward edge of the body;
    a cutter wheel rotationally mounted on the axle and extending beyond the lower surface of the body for contacting glass to score glass;
    the body including a recess in the planar lower surface for receiving a portion of the cutter wheel;
    a window extending from the planar upper surface to the planar lower surface for viewing the cutter wheel and a line to be cut, through the body, during use of the glass cutter; and
    thumb and finger gripping areas on the rearward and forward edges of the upper surface.

4. The apparatus of claim 3 wherein the forward edge of the body includes a planar angled surface extending from the planar lower surface to the planar upper surface of the body to permit the body to be angled forward during use.

5. The apparatus of claim 4 wherein the axle and cutter wheel are mounted at the intersection of the planar angled surface and the planar lower surface of the body.

6. The apparatus of claim 5 wherein the window comprises an aperture having a forward edge and the cutting wheel extends through the forward edge of the window and is visible through the window use.

7. The apparatus of claim 6 wherein the body is formed of a transparent material.

8. The apparatus of claim 7 further comprising a finger rest portion at the forward edge of the upper surface and a thumb rest portion at the rearward edge of the upper surface.

9. The apparatus of claim 8 wherein the rearward edge of the body further includes a notch for receiving an edge of glass for breaking glass.

10. The apparatus of claim 9 wherein the body is generally rectangular in shape.

11. A glass cutter comprising:
    a front portion having front, rear, side and lower surfaces, the front portion being at an angle from the lower surface to permit the glass cutter to be angled forward during use;
    a back portion having front, rear, side and lower surfaces;
    at least one arm connecting the front portion to the back portion;
    a cutting wheel mounted in the front portion, the cutting wheel extending at least partially below the lower surface of the front portion.

12. The apparatus of claim 11 wherein the cutter wheel is positioned at the intersection of the forward portion and at least one arm.

13. The apparatus of claim 12 wherein two arms connect the front portion to the back portion, and two arms spaced apart to define a window therebetween.

* * * * *